(12) United States Patent
Yamada et al.

(10) Patent No.: US 10,270,629 B2
(45) Date of Patent: Apr. 23, 2019

(54) WIRELESS RELAY DEVICE, PROCESSING APPARATUS, WIRELESS COMMUNICATION SYSTEM, AND WIRELESS COMMUNICATION METHOD

(71) Applicant: YOKOGAWA ELECTRIC CORPORATION, Musashino-shi, Tokyo (JP)

(72) Inventors: Haruka Yamada, Tokyo (JP); Naoyuki Fujimoto, Tokyo (JP); Minoru Midorikawa, Tokyo (JP); Masato Yamaji, Tokyo (JP); Kenichi Takeda, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 157 days.

(21) Appl. No.: 15/238,179

(22) Filed: Aug. 16, 2016

(65) Prior Publication Data

US 2017/0054579 A1 Feb. 23, 2017

(30) Foreign Application Priority Data

Aug. 20, 2015 (JP) ................ 2015-162455

(51) Int. Cl.
| | | |
|---|---|---|
| *H04B 7/212* | (2006.01) | |
| *H04L 25/20* | (2006.01) | |
| *H04W 16/24* | (2009.01) | |
| *H04L 12/891* | (2013.01) | |
| *H04W 88/04* | (2009.01) | |
| *H04W 88/16* | (2009.01) | |

(52) U.S. Cl.
CPC ............. *H04L 25/20* (2013.01); *H04B 7/212* (2013.01); *H04L 47/41* (2013.01); *H04W 16/24* (2013.01); *H04W 88/04* (2013.01); *H04W 88/16* (2013.01)

(58) Field of Classification Search
CPC ......... H04L 47/41; H04L 25/20; H04B 7/212; H04J 3/0685
See application file for complete search history.

(56) References Cited

U.S. PATENT DOCUMENTS

| | | | | |
|---|---|---|---|---|
| 2007/0002850 A1* | 1/2007 | Guichard | ................ | H04L 45/50 370/389 |
| 2008/0254743 A1* | 10/2008 | Nishikawa | ........... | H04B 7/1555 455/24 |
| 2011/0182231 A1* | 7/2011 | Wang | ...................... | H04L 45/12 370/315 |

(Continued)

FOREIGN PATENT DOCUMENTS

| | | |
|---|---|---|
| JP | 2004-200889 A | 7/2004 |
| JP | 2013-175963 A | 9/2013 |

(Continued)

*Primary Examiner* — Omer S Mian
(74) *Attorney, Agent, or Firm* — Sughrue Mion, PLLC (57) ABSTRACT

A wireless relay device for relaying packets via a wireless network includes an aggregator and a transfer controller. The aggregator is configured to aggregate a plurality of sets of data respectively included in a plurality of first packets transmitted from a plurality of wireless devices in the wireless network and under the wireless relay device to generate a second packet. The plurality of first packets is addressed to the wireless relay device. The transfer controller is configured to transfer the second packet to a transfer destination.

16 Claims, 7 Drawing Sheets

(56) References Cited

U.S. PATENT DOCUMENTS

| | | | | |
|---|---|---|---|---|
| 2012/0009866 A1* | 1/2012 | Zhang | ................ | H04W 76/11 |
| | | | | 455/7 |
| 2012/0281549 A1* | 11/2012 | Yu | ................ | H04W 28/06 |
| | | | | 370/242 |
| 2013/0044623 A1* | 2/2013 | Speight | ................ | H04B 7/15528 |
| | | | | 370/252 |
| 2015/0117464 A1 | 4/2015 | Miyamoto | | |
| 2015/0163695 A1* | 6/2015 | Li | ................ | H04W 12/06 |
| | | | | 370/328 |
| 2015/0282054 A1 | 10/2015 | Fujimoto et al. | | |

FOREIGN PATENT DOCUMENTS

| | | |
|---|---|---|
| JP | 2014-086852 A | 5/2014 |
| WO | 2011/113475 A1 | 9/2011 |
| WO | 2013/183649 A1 | 12/2013 |

\* cited by examiner

| TAG NAME | IDENTIFICATION DATA |
|---|---|
| TagA | AA |
| TagB | BB |
| TagC | CC |

| TAG NAME | IDENTIFICATION DATA | PRIORITY |
|---|---|---|
| TagA | AA | 1 |
| TagB | BB | 3 |
| TagC | CC | 2 |

WIRELESS RELAY DEVICE, PROCESSING APPARATUS, WIRELESS COMMUNICATION SYSTEM, AND WIRELESS COMMUNICATION METHOD

BACKGROUND OF THE INVENTION

Field of the Invention

The present invention relates to a wireless relay device, a processing apparatus, a wireless communication system, and a wireless communication method.

Priority is claimed on Japanese Patent Application No. 2015-162455, filed on Aug. 20, 2015, the contents of which are incorporated herein by reference.

Description of Related Art

A distributed control system (DSC) has been built in plants, factories, or the like, thereby a high level of automated operation has been realized. In the distributed control system, on-site devices (measures and actuators), which are referred to as field devices, are connected via a communication means to controllers that controls the field devices. The communication system that forms the base of such a distributed control system had been almost always one that communicates by cable. A wireless communication system that communicates wirelessly in conformance with an industrial wireless communication standard such as ISA100.11a or WirelessHART (registered trademark) has been realized in recent years.

In such a wireless communication system, various data with regard to the process control is transmitted and received via a wireless network. For example, in the wireless communication system in conformance with the above-described ISA100.11a, the wireless network is formed by field devices capable of performing wireless communication (wireless field devices), wireless routers, and backbone routers, packets including sensor data (Publish packets) are transmitted from the wireless field devices, via the wireless routers and backbone routers, to a host system.

Japanese Unexamined Patent Application, First Publication No. 2014-86852 (hereinafter, referred to as Patent Document 1) discloses an example of wireless communication system in conformance with the above-described ISA100.11a, WirelessHART (registered trademark), or the like. Specifically, Patent Document 1 discloses an invention capable of making wireless devices greater than before participate in a wireless network, by making wireless devices participate in the wireless network, which transmit a join request to the wireless network, and making the wireless devices be separated from the wireless network after the wireless communication via the wireless network is finished.

The number of field devices provided in plants or the like increases or decreases based on, generally, the scale of plants or the like, and there are some cases in which, in a large plant or the like, the number of field devices exceeds ten-thousands. Therefore, there is a possibility that, in a large plant or the like, a large wireless network (for example, a wireless network to which wireless field devices greater than ten-thousands, and the like are connected) is built in the future. However, at this time, it is not easy to build a large wireless network due to, mainly, the following two reasons.

(1) Increase in Communication Load

Since the number of field devices is large in a large wireless network, the communication load of wireless relay devices provided in the communication path is increased. For example, in the above-described wireless communication system in conformance with ISA100.11a, when the number of wireless field devices under wireless routers is increased, the communication load of the wireless routers is increased. When the number of wireless routers under backbone routers is increased, the communication load of the backbone routers is increased. If the number of devices is restricted (wireless field devices under wireless routers, or wireless routers under backbone routers) to prevent such an increase of communication load, the building of a large wireless network becomes difficult.

(2) Lack of Wireless Band Resources

Since the number of packets transmitted and received via a wireless network is increased in proportion to the increase of the number of devices connected to the wireless network, the wireless band required for the transmitting and receiving of packets is increased. Since the allocatable wireless band is finite in a wireless communication system, the wireless band resources become scarce as the number of devices connected to the wireless network is increased. Such a lack of wireless band resources restricts the number of devices connectable to the wireless network, and thereby the building of a large wireless network becomes difficult.

SUMMARY OF THE INVENTION

One aspect of the present invention provides a wireless relay device, a processing apparatus, a wireless communication system, and a wireless communication method, which enable to build a large wireless network.

A wireless relay device for relaying packets via a wireless network according to a first aspect of the present invention may include an aggregator and a transfer controller. The aggregator may be configured to aggregate a plurality of sets of data, the plurality of sets of data being respectively included in a plurality of first packets transmitted from a plurality of wireless devices in the wireless network and under the wireless relay device, to generate a second packet. The plurality of first packets may be addressed to the wireless relay device. The transfer controller may be configured to transfer the second packet to a transfer destination.

In the wireless relay device according to the first aspect of the present invention, the aggregator may be configured to aggregate a plurality of sets of time data, each of which is included in a header of each of the plurality of first packets, a plurality of sets of identification data, each of which identifies each of the plurality of wireless devices and is included in the header, and a plurality of sets of payload data, each of which is included in a payload of each of the plurality of first packets, to generate the second packet.

In the wireless relay device according to the first aspect of the present invention, the aggregator may be configured to incorporate reference time data indicating a reference time into the second packet, and to aggregate the plurality of sets of time data, each of which is included in the header of each of the plurality of first packets, as a plurality of sets of offset data, each of which indicates a deviation time with respect to the reference time.

The wireless relay device according to the first aspect of the present invention may further include a storage storing the plurality of sets of data respectively included in the plurality of first packets, and a timing controller configured to control a generation timing that the aggregator generates the second packet using the plurality of sets of data stored in the storage, and a transfer timing that the transfer controller transfers the second packet generated by the aggregator.

The wireless relay device according to the first aspect of the present invention may further include a controller configured to update data previously stored in the storage with new data to be stored in the storage when the storage previously stores the data, a transmission source of which is the same as that of the new data.

In the wireless relay device according to the first aspect of the present invention, each of the plurality of wireless devices may have its own priority. The aggregator may be configured to aggregate the plurality of sets of data in the order of priority, the plurality of sets of data being associated with the priorities of the plurality of wireless devices.

In the wireless relay device according to the first aspect of the present invention, the aggregator may be configured to aggregate the plurality of sets of data respectively included in the plurality of first packets, unless the number of the plurality of first packets exceeds a maximum aggregation number.

In the wireless relay device according to the first aspect of the present invention, packets to be transferred via the wireless network may be encrypted. The wireless relay device may further include an encryption processor configured to decrypt the plurality of first packets addressed to the wireless relay device, and to encrypt the second packet to be transferred to the transfer destination.

In a processing apparatus communicatively connectable to a wireless relay device for relaying packets via a wireless network according to a second aspect of the present invention, the wireless relay device is for aggregating a plurality of sets of data respectively included in a plurality of first packets transmitted from a plurality of wireless devices in the wireless network to generate a second packet. The processing apparatus may include a separator configured to separate data included in the second packet transferred from the wireless relay device to generate a plurality of third packets, and a transferor configured to transfer the plurality of third packets to a transfer destination.

In the processing apparatus according to the second aspect of the present invention, the separator may be configured to separate data of a payload in the second packet based on a plurality of sets of identification data, each of which identifies each of the plurality of wireless devices and is included in the payload in the second packet.

In the processing apparatus according to the second aspect of the present invention, each of the plurality of sets of identification data may have its own priority. The separator may be configured to separate the plurality of sets of identification data included in the payload in the second packet in the order of priority.

In the processing apparatus according to the second aspect of the present invention, the processing apparatus may be configured to set a maximum aggregation number of the plurality of first packets to the wireless relay device.

A wireless communication system for performing wireless communication via a wireless network according to a third aspect of the present invention may include a wireless relay device for relaying packets via the wireless network and a processing apparatus communicatively connectable to the wireless relay device. The wireless relay device may include an aggregator and a transfer controller. The aggregator may be configured to aggregate a plurality of sets of data, the plurality of sets of data being respectively included in a plurality of first packets transmitted from a plurality of wireless devices in the wireless network and under the wireless relay device, to generate a second packet. The plurality of first packets may be addressed to the wireless relay device. The transfer controller may be configured to transfer the second packet to a first transfer destination. The processing apparatus may include a separator configured to separate data included in the second packet transferred from the wireless relay device to generate a plurality of third packets, and a transferor configured to transfer the plurality of third packets to a second transfer destination.

In the wireless communication system according to the third aspect of the present invention, the aggregator may be configured to aggregate a plurality of sets of time data, each of which is included in a header of each of the plurality of first packets, a plurality of sets of identification data, each of which identifies each of the plurality of wireless devices and is included in the header, and a plurality of sets of payload data, each of which is included in a payload of each of the plurality of first packets, to generate the second packet.

In the wireless communication system according to the third aspect of the present invention, the aggregator may be configured to incorporate reference time data indicating a reference time into the second packet, and to aggregate the plurality of sets of time data, each of which is included in the header of each of the plurality of first packets, as a plurality of sets of offset data, each of which indicates a deviation time with respect to the reference time.

In the wireless communication system according to the third aspect of the present invention, the wireless relay device may further include a storage storing the plurality of sets of data respectively included in the plurality of first packets, and a timing controller configured to control a generation timing that the aggregator generates the second packet using the plurality of sets of data stored in the storage, and a transfer timing that the transfer controller transfers the second packet generated by the aggregator.

In the wireless communication system according to the third aspect of the present invention, the wireless relay device may further include a controller configured to update data previously stored in the storage with new data to be stored in the storage when the storage previously stores the data, a transmission source of which is the same as that of the new data.

In the wireless communication system according to the third aspect of the present invention, each of the plurality of wireless devices may have its own priority. The aggregator may be configured to aggregate the plurality of sets of data in the order of priority, the plurality of sets of data being associated with the priorities of the plurality of wireless devices.

In the wireless communication system according to the third aspect of the present invention, the aggregator may be configured to aggregate the plurality of sets of data respectively included in the plurality of first packets, unless the number of the plurality of first packets exceeds a maximum aggregation number.

A wireless communication method for performing wireless communication via a wireless network according to a fourth aspect of the present invention may include aggregating a plurality of sets of data respectively included in a plurality of first packets transmitted via the wireless network to generate a second packet, transferring the second packet to a first transfer destination via the wireless network, separating data included in the second packet to generate a plurality of third packets, and transferring the plurality of third packets to a second transfer destination.

According to one aspect of the present invention, a plurality of sets of data included in a plurality of first packets, which are addressed to the own device and transmitted via wireless network, is aggregated to generate a second packet, and the generated second packet is transferred to a predetermined transfer destination via the wireless network. Since the number of packets to be transferred via the wireless network (the total data amount of packets) is reduced, it is possible to build a large wireless network.

DETAILED DESCRIPTION OF THE INVENTION

Hereinafter, a wireless relay device, a processing apparatus, a wireless communication system, and a wireless communication method according to some embodiments of the present invention will be described in detail with reference to the drawings.

First Embodiment

<Wireless Communication System>

Figure 1:
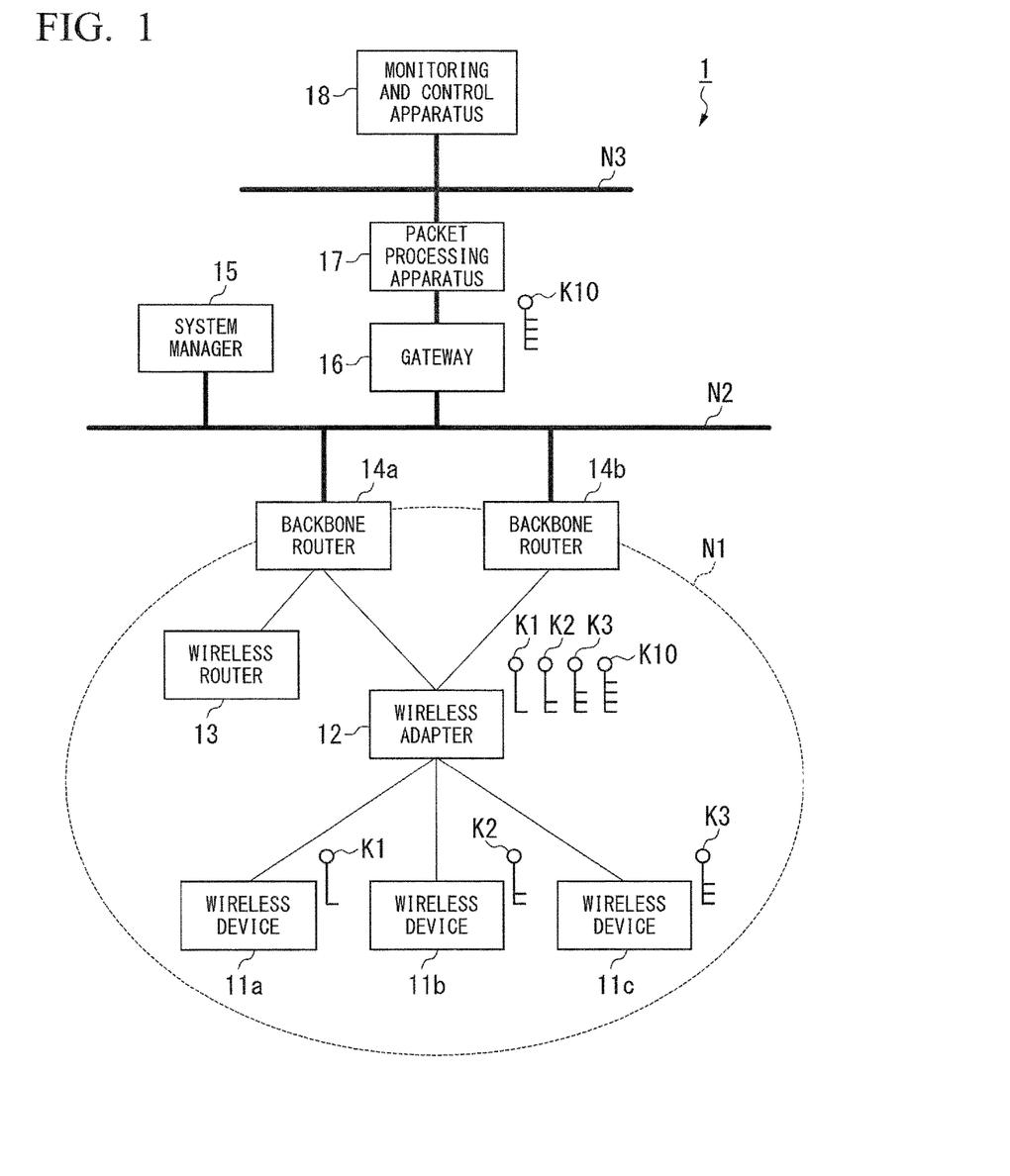
FIG. 1 is a block diagram showing an entire configuration of a wireless communication system according to a first embodiment of the present invention.

FIG. 1 is a block diagram showing an entire configuration of a wireless communication system according to the first embodiment of the present invention. As shown in FIG. 1, a wireless communication system 1 according to the present embodiment includes wireless devices 11a to 11c (wireless device), a wireless adapter 12 (wireless relay device), a wireless router 13, backbone routers 14a and 14b, a system manager 15, a gateway 16, a packet processing apparatus 17 (processing apparatus), and a monitoring and control apparatus 18. The wireless communication system 1 having such a configuration is capable of wireless communication using a time division multiple access (TDMA) scheme via a wireless network N1.

The wireless communication system 1 is built in, for example, a plant, a factory, or the like (hereinafter collectively referred to as simply a "plant"). The above-described plant includes a plant that manages and controls a wellhead such as a gas field or an oil field and its surroundings, a plant that manages and controls power generation, such as hydropower generation, thermal power generation, and nuclear power generation, a plant that manages and controls energy harvesting such as solar power generation or wind power generation, a plant that manages and controls water and sewage or a dam, or the like, in addition to an industrial plant such as a chemical plant.

The above-described wireless network N1 is formed by devices (the wireless devices 11a to 11c, the wireless adapter 12, the wireless router 13, and the backbone routers 14a and 14b) installed at a site of the plant, and is managed by the system manager 15. In FIG. 1, although the illustration is simplified, the number of wireless devices 11a to 11c, wireless adapter 12, wireless router 13, and backbone routers 14a and 14b, which form the wireless network N1, is optional. A plurality of subnetworks, each of which includes the wireless devices 11a to 11c communicatively connected under the wireless adapter 12, may be formed.

Further, in addition to the above-described wireless network N1, a backbone network N2 and a control network N3 are provided in the plant in which the wireless communication system 1 is built. The backbone network N2 is a wired network that is a backbone of the wireless communication system 1, and to which the backbone routers 14a and 14b, the system manager 15, and the gateway 16 are connected. The control network N3 is a wired network located at a higher level of the backbone network N2, and to which the gateway 16, the packet processing apparatus 17, and the monitoring and control apparatus 18 are connected. The backbone network N2 and the control network N3 may be realized as a wireless communication network.

The wireless devices 11a to 11c are field devices (wireless field devices) that are installed at a site of the plant and perform a measurement, an operation, or the like necessary for process control under the control of the monitoring and control apparatus 18. For example, each of the wireless devices 11a to 11c is a sensor device such as a flow gauge or temperature sensor, a valve device such as a flow control valve or open/close valve, an actuator device such as a fan or motor, an imaging device such as a camera or video that images a condition or observed target in the plant, an acoustic device such as a microphone or speaker that collects abnormal sounds or the like in a plant or outputs alarms or the like, a position detecting device that outputs position information of various devices, or some other device. The wireless devices 11a to 11c operate with good energy efficiency (for example, operating intermittently), are powered by a battery, and can wirelessly communicate by TDMA in conformance with the wireless communication standard ISA100.11a.

In the present embodiment, in order to simplify the description, a description will be provided for the case in which the wireless devices 11a to 11c shown in FIG. 1 are a sensor device for measuring flow rate, a sensor device for measuring temperature, and a sensor device for measuring pressure. Different encryption keys are distributed to the wireless devices 11a to 11c in order to ensure the security. Specifically, an encryption key K1 is distributed to the wireless device 11a, an encryption key K2 is distributed to the wireless device 11b, and an encryption key K3 is distributed to the wireless device 11c.

The encryption key K1 is used to perform encrypted communication between the wireless device 11a and the wireless adapter 12. The encryption key K2 is used to perform encrypted communication between the wireless device 11b and the wireless adapter 12. The encryption key K3 is used to perform encrypted communication between the wireless device 11c and the wireless adapter 12. The encryption keys K1 to K3 are distributed by the system manager 15 when the wireless devices 11a to 11c participate in the wireless network N1.

The transmission setting of packets is performed for the wireless devices 11a to 11c. Specifically, the wireless adapter 12 as a packet transmission destination is set in the wireless devices 11a to 11c, and the transmission timing (transmission interval) of packets to the wireless adapter 12 is also set in the wireless devices 11a to 11c. These settings are performed by the gateway 16 after the wireless devices 11a to 11c participate in the wireless network N1.

The wireless adapter 12 is capable of wireless communication in conformance with the above-described wireless communication standard ISA100.11a. The wireless adapter 12 is communicatively connected to the wireless network N1 and performs relay of packets via the wireless network N1. Specifically, the wireless adapter 12 receives packets (first packets) addressed to the own device from the wireless devices 11a to 11c under the wireless adapter 12 in the wireless network N1, aggregates a plurality of sets of data respectively included in the packets to generate an aggregated packet (second packet), and transfers the generated aggregated packet to a predetermined transfer destination. In the present embodiment, a description will be provided for the case in which the transfer destination of the aggregated packet generated by the wireless adapter 12 is the gateway 16.

The wireless adapter 12 decrypts the packets addressed to the own device and transmitted from the wireless devices 11a to 11c, encrypts the generated aggregated packet, and transfers the encrypted aggregated packet to the predetermined transfer destination (gateway 16). The decryption of the packets addressed to the own device and transmitted from the wireless devices 11a to 11c is necessary to aggregate a plurality of sets of data included in the packets. The encryption of the aggregated packet is for ensuring the security.

As shown in FIG. 1, different encryption keys are distributed to the wireless adapter 12 in order to ensure the security. Specifically, in addition to the above-described encryption keys K1 to K3, an encryption key K10 is distributed to the wireless adapter 12. The encryption key K10 is used to perform the encrypted communication between the wireless adapter 12 and the gateway 16. The encryption keys K1 to K3, and K10 are distributed by the system manager 15 when the wireless adapter 12 participates in the wireless network N1. The detail of the wireless adapter 12 will be described later.

The backbone routers 14a and 14b connect the wireless network N1 to the backbone network N2, and performs relay of data transmitted or received between the wireless network N1 and the backbone network N2. The backbone routers 14a and 14b also perform the wireless communication in conformance with the above-described wireless communication standard ISA100.11a.

The system manager 15 controls the wireless communication that is performed via the wireless network N1. Specifically, the system manager 15 controls allocation of communication resources (a time slot and a communication channel) to the wireless devices 11a to 11c, the wireless adapter 12, the wireless router 13, the backbone routers 14a and 14b, and the gateway 16 to realize the wireless communication using TDMA via the wireless network N1. The system manager 15 performs a process of determining whether the wireless devices 11a to 11c, the wireless adapter 12, the wireless router 13, and the backbone routers 14a and 14b are caused to participate in the wireless network N1 (participation process). The system manager 15 distributes encryption keys (for example, the above-described encryption keys K1 to K3, and K10) when causing the wireless devices 11a to 11c, the wireless adapter 12, the wireless router 13, and the backbone routers 14a and 14b to participate in the wireless network N1.

The gateway 16 connects the backbone network N2 to the control network N3, and performs relay of various data to be transmitted and received between the wireless devices 11a to 11c, the system manager 15, or the like and the monitoring and control apparatus 18. By providing the gateway 16, it is possible to connect the backbone network N2 and the control network N3 to each other while maintaining the security. The gateway 16 performs the above-described transmission setting of packets for the wireless devices 11a to 11c participating in the wireless network N1. The above-described encryption key K10 is distributed to the gateway 16 in order to ensure the security. The gateway 16 decrypts the aggregated packet transferred from the wireless adapter 12 using the encryption key K10, and inputs the decrypted packet into the packet processing apparatus 17.

The packet processing apparatus 17 processes the aggregated packet output from the gateway 16. Specifically, the packet processing apparatus 17 separates the decrypted data included in the aggregated packet output from the gateway 16 to generate the separated packets (third packets), and transfers the separated packets to the predetermined transfer destination. In the present embodiment, a description will be provided for the case in which the transfer destination of the separated packets generated by the packet processing apparatus 17 is the monitoring and control apparatus 18. In other words, the packet processing apparatus 17 is communicatively connected to the wireless adapter 12, and provided to separate the data aggregated by the wireless adapter 12.

The packet processing apparatus 17 sets identification data (identifier to identify each of the wireless devices 11a to 11c) with respect to each of the wireless devices 11a to 11c. The packet processing apparatus 17 sets, with respect to the wireless adapter 12, the transfer timing of the aggregated packet generated by the wireless adapter 12. The above-described timing is set in consideration of the time interval that the monitoring and control apparatus 18 monitors the wireless devices 11a to 11c, and the like. The detail of the packet processing apparatus 17 will be described later.

The monitoring and control apparatus 18 monitors and manages the wireless devices 11a to 11c, and the like. Specifically, the monitoring and control apparatus 18 monitors the wireless devices 11a to 11c, and the like by collecting a plurality of sets of data included in the separated packets transmitted from the packet processing apparatus 17. The monitoring and control apparatus 18 calculates, using the collected various data, a control amount of a wireless device for performing various controls (for example, a valve device) not shown in FIG. 1, and transmits control data indicating the control amount via the gateway 16 at a regular time intervals to control the wireless device.

<Wireless Relay Device>

Figure 2:
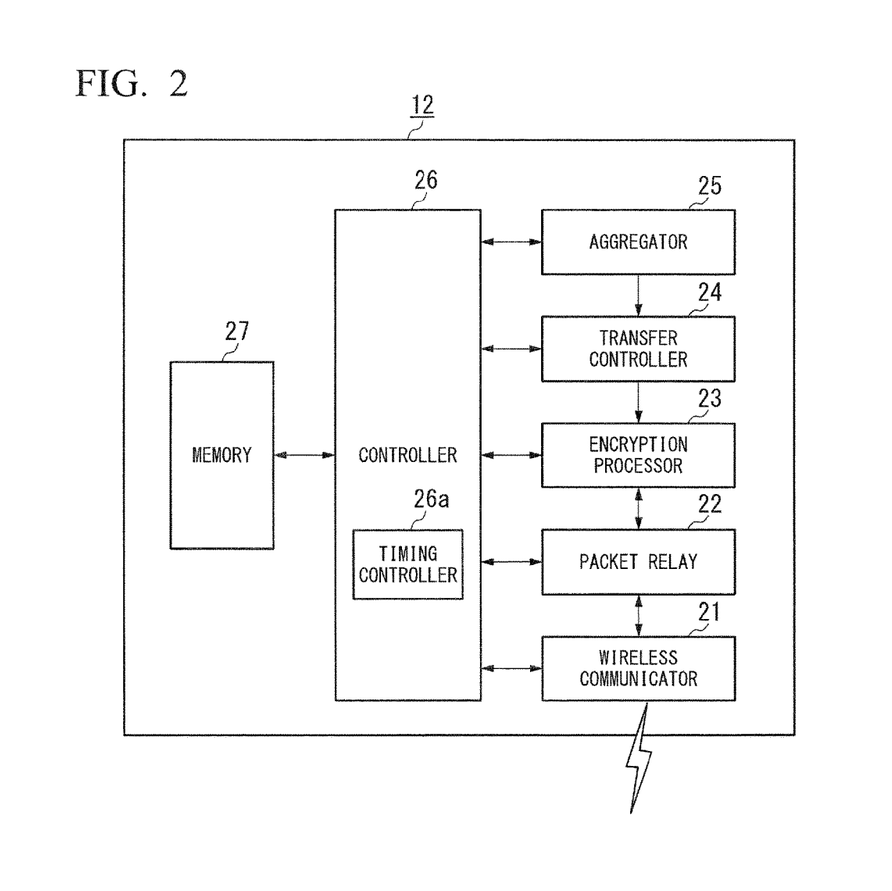
FIG. 2 is a block diagram showing a main configuration of a wireless adapter as a wireless relay device according to the first embodiment of the present invention.

FIG. 2 is a block diagram showing a main configuration of a wireless adapter as a wireless relay device according to the first embodiment of the present invention. As shown in FIG. 2, the wireless adapter 12 includes a wireless communicator 21, a packet relay 22, an encryption processor 23, a transfer controller 24, an aggregator 25, a controller 26, and a memory 27 (storage). The wireless adapter 12 aggregates a plurality of sets of data included in the packets addressed to the own device to generate the aggregated packet, and transfers the aggregated packet to the predetermined transfer destination (gateway 16).

The wireless communicator 21 performs transmitting and receiving of wireless signals under the control of the controller 26. Specifically, the wireless communicator 21 receives the packets as wireless signals transmitted via the wireless network N1, changes the aggregated packet to be transmitted via the wireless network N1 to wireless signals, and transmits the wireless signals. The packet relay 22 performs relay processing of packets (including the aggregated packet) transmitted and received by the wireless communicator 21 under the control of the controller 26. Specifically, the packet relay 22 inputs the packets into the encryption processor 23 when the packets received by the wireless communicator 21 are addressed to the own device, and inputs the packets into the wireless communicator 21 when the packets received by the wireless communicator 21 are not addressed to the own device. The packet relay 22 inputs the aggregated packet output from the encryption processor 23 into the wireless communicator 21.

The encryption processor 23 performs encryption processing using the encryption keys K1 to K3, and K10 shown in FIG. 1 under the control of the controller 26. Specifically, the encryption processor 23 decrypts the packets output from the packet relay 22, and inputs the decrypted packets into the controller 26. The encryption processor 23 encrypts the aggregated packet output from the transfer controller 24, and inputs the encrypted packet into the packet relay 22. For example, the encryption processor 23 decrypts the packets addressed to the own device and transmitted from the wireless devices 11a to 11c via the wireless network N1 using the encryption keys K1 to K3, respectively, and inputs the decrypted packets into the controller 26. The encryption processor 23 encrypts the aggregated packet output from the transfer controller 24 using the encryption key K10, and inputs the encrypted packet into the packet relay 22.

The transfer controller 24 transfers the aggregated packet generated by the aggregator 25 to the predetermined transfer destination (gateway 161) under the control of the controller 26. The transfer controller 24 performs the above-described transfer processing at a timing defined by a timing controller 26a provided in the controller 26. The aggregator 25 aggregates a plurality of sets of data stored in the memory 27 (the data of the packets addressed to the own device and transmitted from the wireless devices 11a to 11c) to generate the aggregated packet to be transferred to the gateway 16 under the control of the controller 26. The aggregator 25 generates the aggregated packet to be transferred to the gateway 16 at a timing defined by the timing controller 26a provided in the controller 26.

Figure 3:
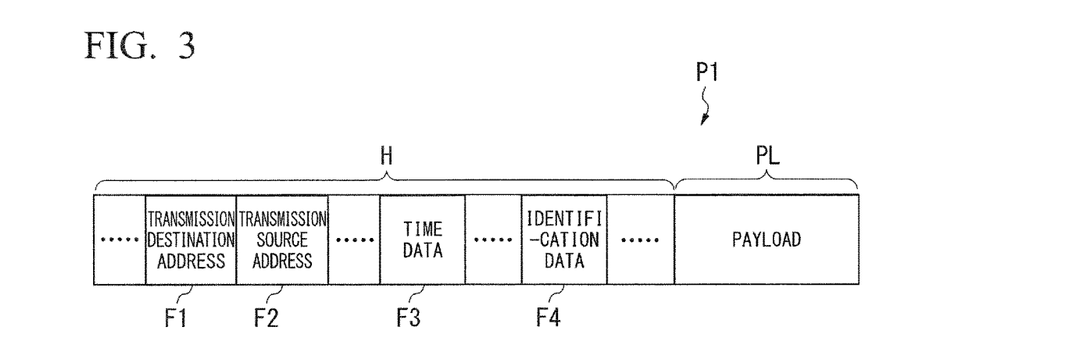
FIG. 3 is a diagram schematically showing a format of a packet to be transmitted from the wireless device to the wireless adapter in the first embodiment of the present invention.

FIG. 3 is a diagram schematically showing a format of a packet to be transmitted from the wireless device to the wireless adapter in the first embodiment of the present invention. As shown in FIG. 3, a packet P1 includes a header H and a payload PL. The header H includes a field F1 storing a transmission destination address, a field F2 storing a transmission source address, a field F3 storing time data indicating the generation time of packet, a field F4 storing the identification data (identifier to identify each of the wireless devices 11a to 11c), and the like. The payload PL stores sensor data (data indicating flow rate, temperature, pressure, or the like, measured by each of the wireless devices 11a to 11c).

The size of the header H in the packet P1 is approximately a few tens of bytes, and the size of the payload PL in the packet P1 is approximately a few to approximately ten of bytes. In other words, it can be said that, in the packet P1, the header H is generally greater than the payload PL. The size of the time data stored in the field F3 of the header H is approximately equal to 4 byte, and the size of the identification data stored in the field F4 of the header H is approximately equal to 2 byte.

The aggregator 25 aggregates the time data (the time data stored in the field F3 of the header H), the identification data (the identification data stored in the field F4 of the header H), and the sensor data (the sensor data stored in the payload), which are included in the packet P1 transmitted from each of the wireless devices 11a to 11c. Such a aggregation reduces the number of packets (total data amount of packets) to be transmitted and received via the wireless network N1 while leaving the data necessary for the monitoring and controlling of the wireless devices 11a to 11 c and the like, and thereby enables the building of the large wireless network N1.

The controller 26 overall controls the operation of the wireless adapter 12. For example, the controller 26 controls the wireless communicator 21 the packet relay 22, the encryption processor 23, the transfer controller 24, and the aggregator 25 to aggregate the packets addressed to the own device and to perform the transfer processing of the aggregated packet. The controller 26 includes the timing controller 26a for controlling the operation timing of the transfer controller 24 and the aggregator 25. The timing controller 26a controls the transfer controller 24 and the aggregator 25 so that the aggregated packet to be transferred to the gateway 16 is transferred at a timing defined by the packet processing apparatus 17. The memory 27 is, for example, a non-volatile semiconductor memory, and stores the data of the packets addressed to the own device and transmitted from the wireless devices 11a to 11c, and the like, under the control of the controller 26.

<Processing Apparatus>

Figure 4:
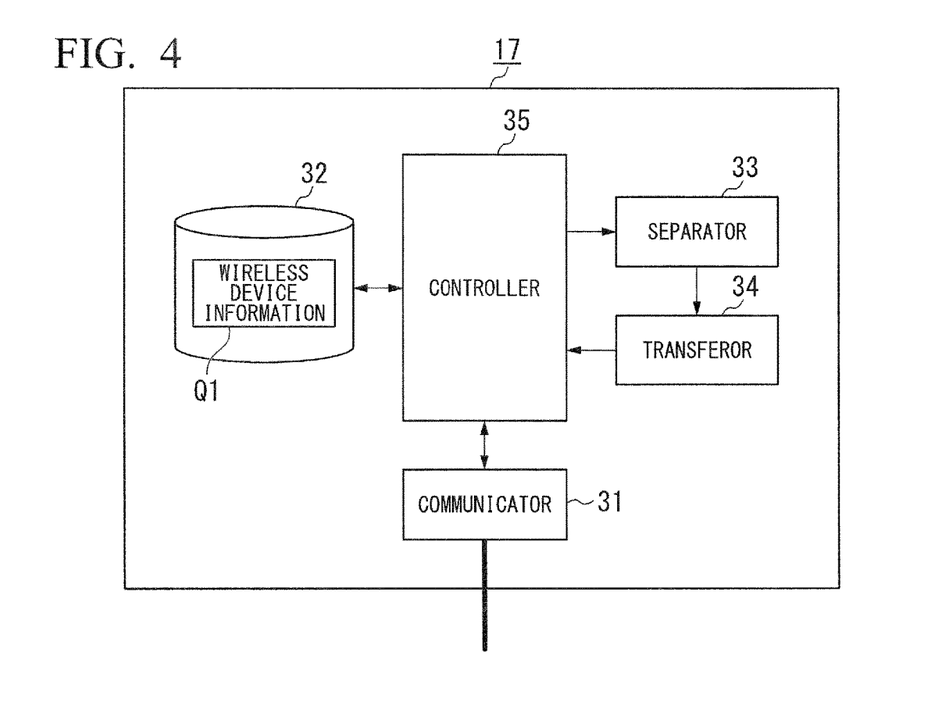
FIG. 4 is a block diagram showing a main configuration of a packet processing apparatus as a processing apparatus according to the first embodiment of the present invention.

FIG. 4 is a block diagram showing a main configuration of a packet processing apparatus as a processing apparatus according to the first embodiment of the present invention. As shown in FIG. 4, the packet processing apparatus 17 includes a communicator 31, a storage device 32, a separator 33, a transferor 34, and a controller 35. The packet processing apparatus 17 separates the data included in the aggregated packet output from the gateway 16 to generate the separated packets, and transfers the separated packets to the predetermined transfer destination (monitoring and control apparatus 18).

The communicator 31 performs transmitting and receiving of packets under the control of the controller 35. Specifically, the communicator 31 receives the aggregated packet output from the gateway 16, and transmits the separated packets generated in the packet processing apparatus 17 to the monitoring and control apparatus 18. The storage device 32 includes, for example, a non-volatile semiconductor memory. The storage device 32 stores wireless device information Q1, and stores the aggregated packet output from the gateway 16 under the control of the controller 35.

Figure 5:
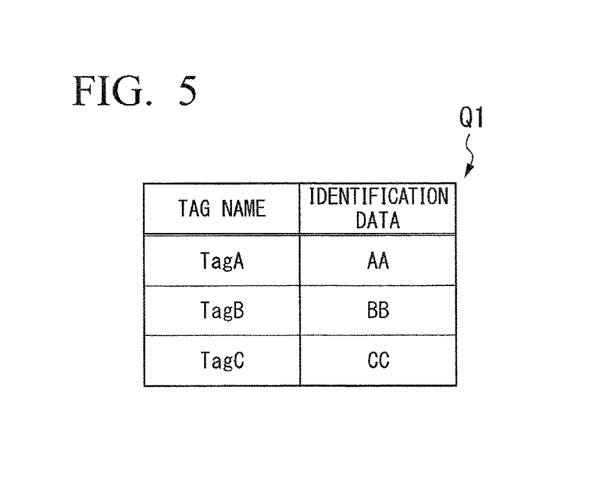
FIG. 5 is a diagram showing an example pf wireless device information used by the processing apparatus according to the first embodiment of the present invention.

FIG. 5 is a diagram showing an example pf wireless device information used by the processing apparatus according to the first embodiment of the present invention. As shown in FIG. 5, in the wireless device information Q1, the tag names of the wireless devices 11a to 11c and the identification data are associated with each other. The wireless device information Q1 is used when the separator 33 separates the data included in the aggregated packet output from the gateway 16. In the example shown in FIG. 5, a "TagA" is a tag name of the wireless device 11a, a "TagB" is a tag name of the wireless device 11b, and a "TagC" is a tag name of the wireless device 11c. In the example shown in FIG. 5, an "AA" is an identification data pf the wireless device 11a, a "BB" is an identification data of the wireless device 11b, and a "CC" is an identification data of the wireless device 11c.

The separator 33 separates the data included in the aggregated packet output from the gateway 16 and stored in the storage device 32 using the wireless device information Q1 stored in the storage device 32 to generate the separated packets. The separator 33 separates the data of the payload in the aggregated packet stored in the storage device 32 based on the identification data included in the data. The detail will be described later.

The transferor 34 transfers the separated packets generated by the separator 33 to the predetermined transfer destination (monitoring and control apparatus 18). The controller overall controls the operation of the packet processing apparatus 17. For example, the controller 35 stores the aggregated packet output from the gateway 16 and received by the communicator 31 into the storage device 32. The controller 35 controls the separator 33 and the transferor 34 to separate the aggregated packet stored in the storage device 32 and perform the transfer processing of the separated packets.

<Wireless Communication Method>

Figure 6:
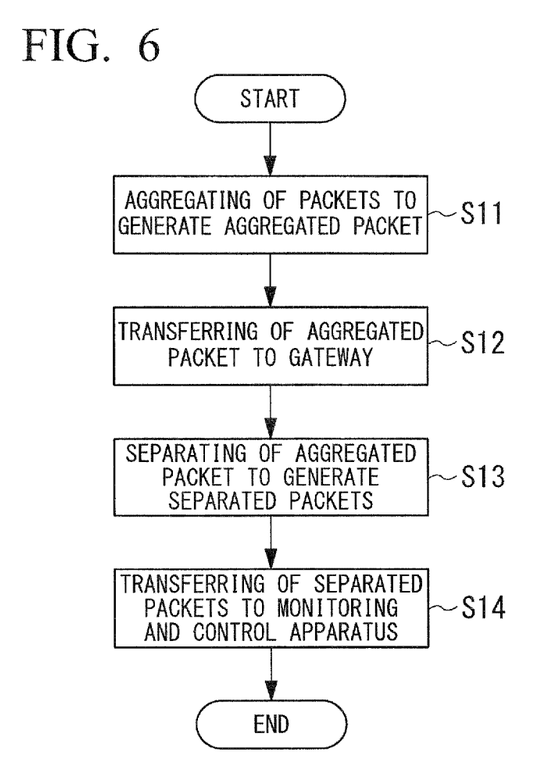
FIG. 6 is a flowchart schematically showing a wireless communication method according to the first embodiment of the present invention.
Figure 7:
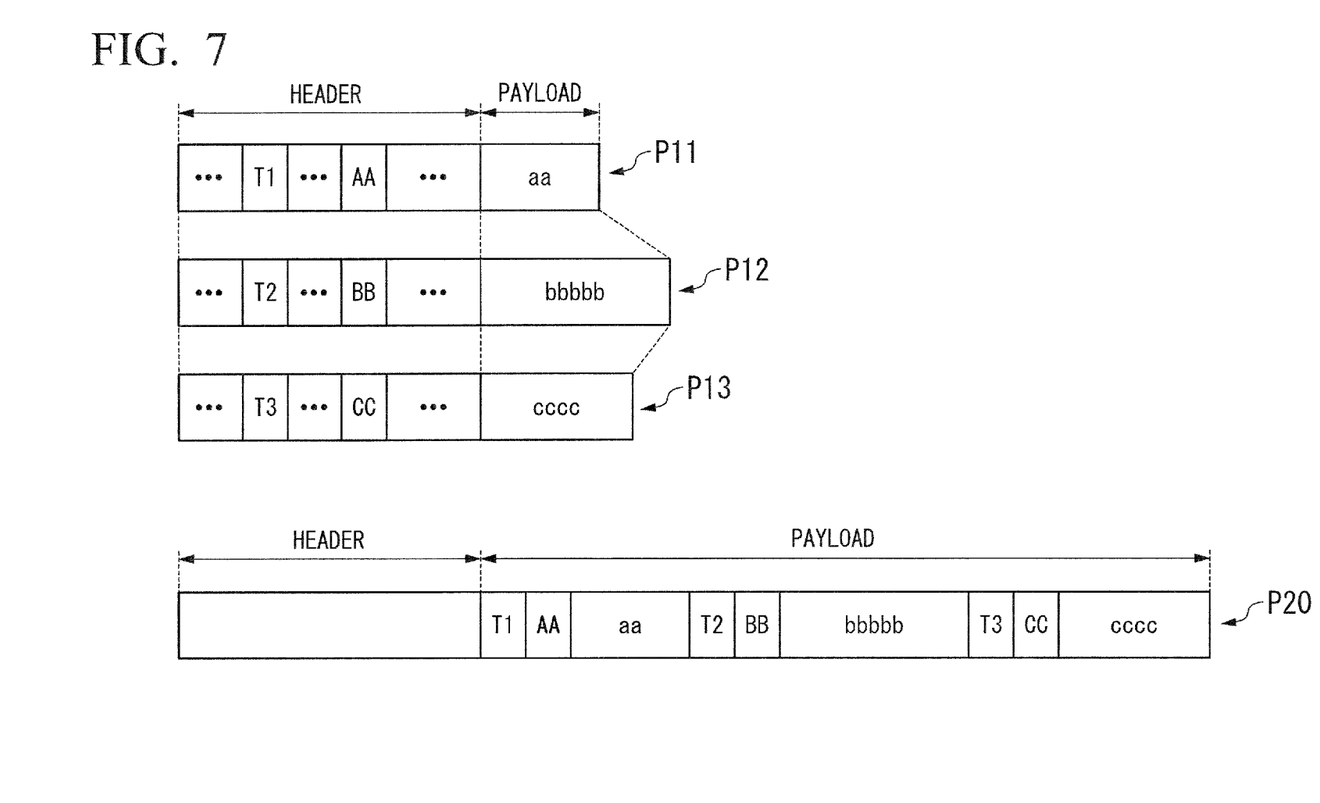
FIG. 7 is a diagram showing a specific example of packets transmitted and received in the first embodiment of the present invention.

FIG. 6 is a flowchart schematically showing a wireless communication method according to the first embodiment of the present invention. FIG. 7 is a diagram showing a specific example of packets transmitted and received in the first embodiment of the present invention. In order to facilitate the understanding of the present invention, a description will be provided for the case in which the packet transmitted from the wireless devices 11a, the packet transmitted from the wireless devices 11b, and the packet transmitted from the wireless devices 11c are a packet P11, a packet P12, and a packet P13, respectively.

Specifically, in the packet P11 transmitted from the wireless device 11a, a time data "T1" and an identification data "AA" are included in the header, a sensor data "aa" is stored in the payload. In the packet P12 transmitted from the wireless device 11b, a time data "T2" and an identification data "BB" are included in the header, a sensor data "bbbbb" is stored in the payload. In the packet P13 transmitted from the wireless device 11c, a time data "T3" and an identification data "CC" are included in the header, a sensor data "cccc" is stored in the payload.

When the packet P11 shown in FIG. 7 is transmitted from the wireless device 11a to the wireless adapter 12, the packet P11 is received by the wireless communicator 21 of the wireless adapter 12 and input into the packet relay 22 (refer to FIG. 2). Since the packet transmitted from the wireless device 11a is addressed to the wireless adapter 12, the packet input into the packet relay 22 is input into the encryption processor 23. Next, the encryption processor 23 decrypts the packet transmitted from the wireless device 11a using the encryption key K1 (refer to FIG. 1). The decrypted packet is output from the encryption processor 23 to the controller 26, and stored in the memory 27.

Also, when the packet P12 shown in FIG. 7 is transmitted from the wireless device 11b to the wireless adapter 12 and when the packet P13 shown in FIG. 7 is transmitted from the wireless device 11c to the wireless adapter 12, the wireless adapter 12 performs a similar processing to that described above. The packet P12 transmitted from the wireless device 11b is decrypted using the encryption key K2, and the packet P13 transmitted from the wireless device 11c is decrypted using the encryption key K3.

After the above-described processing is finished and the timing controller 26a inputs a control signal into the aggregator 25, the aggregator 25 aggregates a plurality of sets of data of the packets stored in the memory 27 (hereinafter, it may be simplified as "packets stored in the memory 27") to generate the aggregated packet (step S11: first step). Specifically, the aggregator 25 aggregates the time data "T1", the identification data "AA", and the sensor data "aa" included in the packet P11 shown in FIG. 7, the time data "T2", the identification data "BB", and the sensor data "bbbbb" included in the packet P12, and the time data "T3", the identification data "CC", and the sensor data "cccc" included in the packet P13. Next, the aggregator 25 generates an aggregated packet P20 (refer to FIG. 7) in which the aggregated data is stored in the payload.

After the above-described processing is finished, the generated aggregated packet P20 is output from the aggregator 25 to the transfer controller 24, and the transfer controller 24 transfers the aggregated packet P20 to the gateway 16 (step S12: second step). Specifically, a processing is performed in which an address of the gateway 16 is stored, as a destination address, in the header of the aggregated packet P20 shown in FIG. 7, and the like. After the above-described transfer processing is finished, the aggregated packet P20 is output from the transfer controller 24 to the encryption processor 23. Next, the encryption processor 23 encrypts the aggregated packet P20 using the encryption key K10 (refer to FIG. 1). The encrypted aggregated packet P20 is output from the encryption processor 23, via the packet relay 22, to the wireless communicator 21 and transmitted to the wireless network N1.

The aggregated packet P20 transmitted from the wireless adapter 12 is received by, for example, the backbone router 14b, via the wireless network N1. The aggregated packet P20 received by the backbone router 14b is received by the gateway 16, via the backbone network N2. The aggregated packet P20 received by the gateway 16 is decrypted using the encryption key K10 distributed to the gateway 16, and input into the packet processing apparatus 17.

The aggregated packet P20 output from the gateway 16 is received by the communicator 31 of the packet processing apparatus 17, and stored in the storage device 32 via the controller 35. Among the data included in the aggregated packet P20, the data of the payload in the aggregated packet P20 is stored in the storage device 32. After the above-described processing is finished, the separator 33 separates the data stored in the storage device 32 to generate the separated packets using the wireless device information Q1 stored in the storage device 32 (step S13: third step).

Specifically, the separator 33 separates the data including the time data "T1", the identification data "AA", and the sensor data "aa" based on the identification data "AA" (refer to FIG. 5) included in the wireless device information Q1 to generate a separated packet. The separator 33 separates the data including the time data "T2", the identification data "BB", and the sensor data "bbbbb" based on the identification data "BB" (refer to FIG. 5) included in the wireless device information Q1 to generate a separated packet. The separator 33 separates the data including the time data "T3", the identification data "CC", and the sensor data "cccc" based on the identification data "CC" (refer to FIG. 5) included in the wireless device information Q1 to generate a separated packet.

The separated packets generated by the separator 33 are similar to the packets P11 to P13 shown in FIG. 7. Specifically, similar to the packet P11 shown in FIG. 7, in the separated packet generated from the data separated based on the identification data "AA", the time data "T1" and the identification data "AA" are included in the header, and the sensor data "aa" is stored in the payload. Similar to the packet P12 shown in FIG. 7, in the separated packet generated from the data separated based on the identification data "BB", the time data "T2" and the identification data "BB" are included in the header, and the sensor data "bbbbb" is stored in the payload. Similar to the packet P13 shown in FIG. 7, in the separated packet generated from the data separated based on the identification data "CC", the time data "T3" and the identification data "CC" are included in the header, and the sensor data "cccc" is stored in the payload.

The header of each of the separated packets generated by the separator 33 is basically different from that of each of the packets P11 to P13 shown in FIG. 7 except the time data and the identification data. The tag name shown in FIG. 5 is included in the header of each separated packet generated by the separator 33. For example, the tag name "TagA" shown in FIG. 5 is included in the header of the separated packet generated from the data separated based on the identification data "AA", the tag name "TagB" shown in FIG. 5 is included in the header of the separated packet generated from the data separated based on the identification data "BB", and the tag name "TagC" shown in FIG. 5 is included in the header of the separated packet generated from the data separated based on the identification data "CC".

After the above-described processing is finished, the generated separated packets are output from the separator 33 to the transferor 34, and the transferor 34 transfers the separated packets to the monitoring and control apparatus 18 (step S14: fourth step). Specifically, the processing is performed in which the address of the monitoring and control apparatus 18 is stored in the header of each separated packet as a destination address, and the like. After the above-described transfer processing is finished, the separated packets are output from the transferor 34, via the controller 35, to the communicator 31, and transmitted from the communicator 31 to the control network N3. The separated packets transmitted from the packet processing apparatus 17 are collected by the monitoring and control apparatus 18 via the control network N3.

As described above, in the present embodiment, the wireless adapter 12 is provided in the wireless network N1 that aggregates a plurality of sets of data included in the packets P11 to P13 addressed to the own device and transmitted from the wireless devices 11a to 11c under the wireless adapter 12 to generate the aggregated packet P20, and the packet processing apparatus 17 is provided outside the wireless network N1 that separates the aggregated packet P20. Thereby, the number of packets to be transmitted and received via the wireless network N1 can be reduced and the communication load can be reduced, and the lack of wireless band resource can be resolved. Therefore, a large wireless network can be built.

Second Embodiment

Next, a second embodiment of the present invention will be described. In the above-described first embodiment, the time data included in the header of the packets P11 to P13 (refer to FIG. 7) transmitted from the wireless devices 11a to 11 c, is directly aggregated in the aggregated packet P20. In the present embodiment, by reducing the size of the time data to be aggregated in the aggregated packet P20, the total size of the aggregated packet P20 is reduced.

Figure 8:
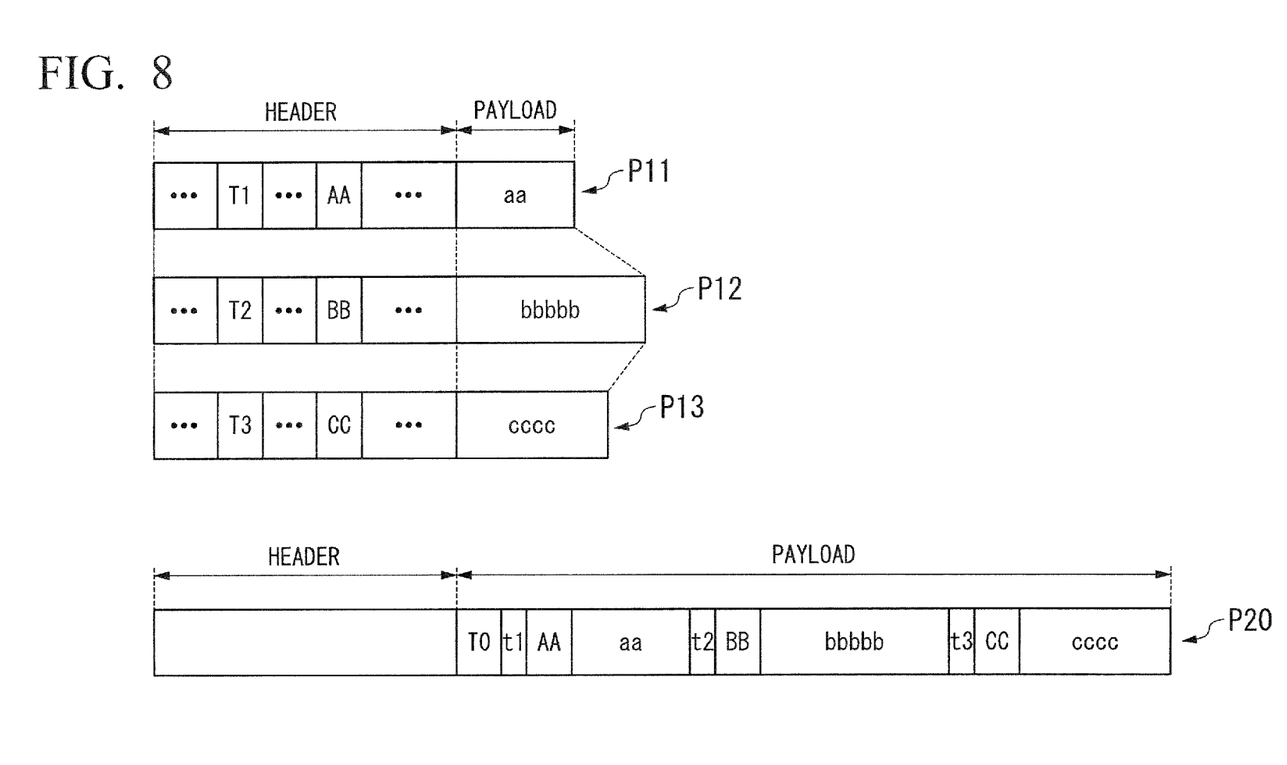
FIG. 8 is a diagram showing a specific example of packets transmitted and received in a second embodiment of the present invention.

FIG. 8 is a diagram showing a specific example of packets transmitted and received in the second embodiment of the present invention. As shown in FIG. 8, in the present embodiment, a reference time data "T0" indicating a reference time is incorporated into the aggregated packet P20, the time data "T1", "T2", and "T3" included in the header of the packets P11 to P13 are aggregated as offset data "t1", "t2", and "t3", each of which indicates a deviation time with respect to the reference time (offset), and thereby, the total size of the aggregated packet P20 is reduced.

In the present embodiment, the relationship among the time data "T1", "T2", and "T3" included in the header of the packets P11 to P13, the reference time data "T0" to be incorporated into the aggregated packet P20, and the offset data "t1", "t2", and "t3" aggregated in the aggregated data P20 is represented by the following equations.

$$T1=T0+t1$$

$$T2=T0+t2$$

$$T3=T0+t3$$

The size of each of the time data "T1" "T2", and "T3", and the reference time data "T0" is approximately equal to 4 byte, but the size of each of the offset data "t1", "t2", and "t3" is approximately equal to 1 byte. Compared to the first embodiment in which the total size of the time data "T1", "T2", and "T3" aggregated in the aggregated packet P20 is approximately equal to 12 byte, in the present embodiment, the total size of the time data aggregated in the aggregated packet P20 (the reference time data "T0" and the offset data "t1", "t2", and "t3") is approximately equal to 7 byte. Therefore, the size of the aggregated time data can be reduced.

The processing for calculating the offset data "t1", "t2", and "t3" and aggregating them and the reference time data "T0" to generate the aggregated packet P20 is performed by the aggregator 25 of the wireless adapter 12 (refer to FIG. 2) when the data included in the packets P11 to P13 is aggregated. The separator 33 of the packet processing apparatus 17 calculates the time data "T1", "T2", and "T3" from the reference time data "T0" and the offset data "t1", "t2", and "t3", which are aggregated in the aggregated packet P20, when the separator 33 separates the data included in the aggregated packet P20.

As described above, in the present embodiment, the reference time data "T0" indicating a reference time is incorporated into the aggregated packet P20, and the time data "T1", "T2", and "T3" included in the header of the packets P11 to P13 are aggregated as the offset data "t1", "t2", and "t3", each of which indicates a deviation time with respect to the reference time (offset). Therefore, compare to the first embodiment, the total size of the aggregated packet P20 can be reduced.

Third Embodiment

Next, a third embodiment of the present invention will be described. In the above-described first embodiment, all of the packets P11 to P13 stored in the memory 27 of the wireless adapter 12 (refer to FIG. 2) are aggregated in the aggregated packet P20. In the present embodiment, by enabling the update of packets stored in the memory 27 of the wireless adapter 12, the number of packets to be aggregated is reduced and use efficiency of a wireless band is improved. For example, the packet processing apparatus 17 shown in FIG. 1 sets whether the update of packets stored in the memory 27 of the wireless adapter 12 is permitted.

Figure 9:
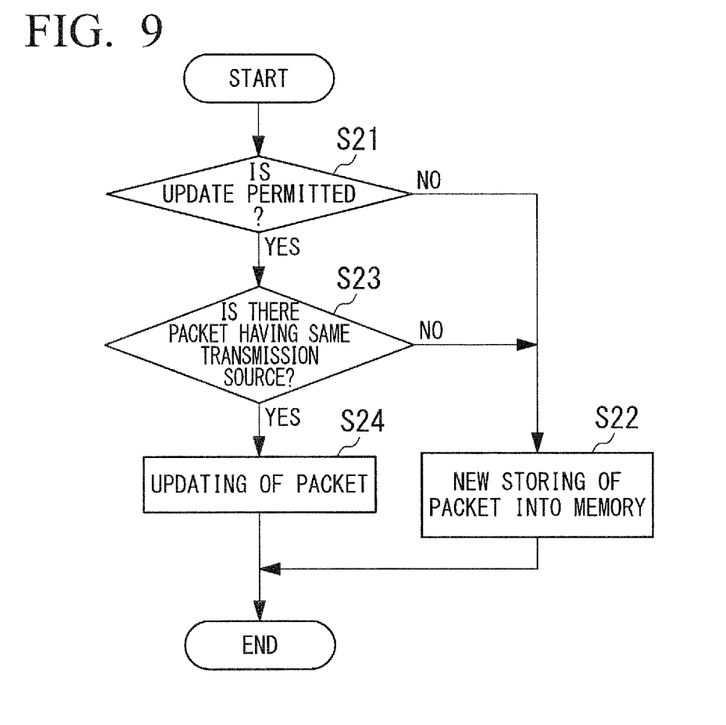
FIG. 9 is a flowchart showing a processing performed by a wireless adapter in a third embodiment of the present invention.

FIG. 9 is a flowchart showing a processing performed by a wireless adapter in the third embodiment of the present invention. The processing of the flowchart shown in FIG. 9 is performed every time the encryption processor 23 of the wireless adapter 12 inputs decrypted packets into the controller 26. When the processing is started, first, the controller 26 determines whether the update of packets stored in the memory 27 is permitted (step S21). When the controller 26 determines that the update of packets stored in the memory 27 is not permitted (the determination result in the step S21 is "NO"), similar to the first embodiment, the controller 26 newly stores packets decrypted by the encryption processor 23 into the memory 27 (step S22).

In contrast, when the controller 26 determines that the update of packets is permitted (the determination result in the step S21 is "YES"), the controller 26 determines whether packets, which are transmitted from the same source as that of packets output from the encryption processor 23, are stored in the memory 27 (step S23). When the controller 26 determines that packets, which are transmitted from the same source as that of packets output from the encryption processor 23, are not stored in the memory 27 (the determination result in the step S23 is "NO"), the controller 26 newly stores the packets output from the encryption processor 23 into the memory 27 (step S22).

In contrast, the controller 26 determines that packets, which are transmitted from the same source as that of packets output from the encryption processor 23, are stored in the memory 27 (the determination result in the step S23 is "YES"), the controller 26 updates the packets stored in the memory 27 (the packets transmitted from the same source as that of packets output from the encryption processor 23) with packets output from the encryption processor 23 (step S24). Thereby, the packets stored in the memory 27 are updated. In the present embodiment, after the packets stored in the memory 27 are aggregated, the packets are deleted.

As described above, in the present embodiment, the update of packets stored in the memory 27 of the wireless adapter 12 is permitted. Therefore, if, for example, a plurality of packets transmitted from the same wireless device is received by the wireless adapter 12 due to the degradation of wireless environment or the like, the packets previously stored in the wireless adapter 12 are updated with newest packets. The number of packets to be aggregated by the wireless adapter 12 is reduced, and thus the use efficiency of a wireless band is improved. Since the control is possible of whether the update of packets stored in the memory 27 of the wireless adapter 12 is permitted, the operation suitable for the usage or characteristics of the wireless devices 11a to 11c is possible.

Fourth Embodiment

Next, a fourth embodiment of the present invention will be described. In the above-described first embodiment, all of the packets P11 to P13 stored in the memory 27 of the wireless adapter 12 (refer to FIG. 2) are aggregated in the aggregated packet P20. In the present embodiment, by setting a maximum aggregation number defining an upper limit of an aggregation number of packets, the control is possible of whether giving priority to the use efficiency of a wireless band or the shortening of the collection time of packets (a time from start of a transmission of packets from the wireless devices 11a to 11c to a collection of the packets by the monitoring and control apparatus 18). The setting of the maximum aggregation number is performed by, for example, the packet processing apparatus 17 shown in FIG. 1.

The above-described maximum aggregation number is set so that a time required to transmit the aggregation packet P20 generated by the wireless adapter 12 is not over a time of a one time slot (1 msec). The maximum aggregation number is set, for example, in a range from approximately "5" to approximately "10", depending on the data size to be stored in the payload of the packets P11 to P13 transmitted from the wireless devices 11a to 11c.

Under the condition where the maximum aggregation number is set in the wireless adapter 12, when the packets stored in the memory 27 are aggregated, the aggregator 25 of the wireless adapter 12 determines whether the number of the packets stored in the memory 27 is over the maximum aggregation number. When the aggregator 25 determines that the number of the packets stored in the memory 27 is not over the maximum aggregation number, similar to the first embodiment, the aggregator 25 aggregates all of the packets stored in the memory 27 to generate the aggregated packet P20.

In contrast, when the aggregator 25 determines that the number of the packets stored in the memory 27 is over the maximum aggregation number, the aggregator 25 aggregates the packets so that the number of packets to be aggregated is not over the maximum aggregation number, in other words, the aggregator aggregates a plurality of sets of data, unless the number of the plurality of packets exceeds a maximum aggregation number. For example, the aggregator 25 aggregates packets, the number of which is equal to the maximum aggregation number, among the packets stored in the memory 27. In this case, with reference to the time indicated by the time data for each packet, the packets are selected in ascending order by time and aggregated. Thereby, the number of packets to be aggregated in the aggregated packet P20 is restricted. Among the packets stored in the memory 27, the packets, which are not aggregated at this time, are aggregated from the next time.

As described above, in the present embodiment, the maximum aggregation number is set and the aggregation number of packets is restricted. If the maximum aggregation number is set to be a large number, more packets can be aggregated in the aggregated packet P20, and the use efficiency of a wireless band can be improved. In contrast, if the maximum aggregation number is set to be a small number, the number of packets to be aggregated in the aggregated packet P20 is reduced. Thereby, the waiting time required to obtain packets to be aggregated in the aggregated packet P20 (aggregated packet generation time) can be reduced, and thus the collection time of packets can be reduced. Therefore, in the present embodiment, the control is possible of whether giving priority to the use efficiency of a wireless band or the shortening of the collection time of packets.

Fifth Embodiment

Next, a fifth embodiment of the present invention will be described. In the above-described first embodiment, the packets P11 to P13 (refer to FIG. 7) stored in the memory 27 of the wireless adapter 12 are aggregated in the aggregated packet P20 in ascending of order of code numbers (P11, P12, P13) assigned to indicate each packet (specifically, in the order of the packet P11, the packet P12, and the packet P13). In the above-described first embodiment, the generation order of the separated packets by the separator 33 of the packet processing apparatus 17 (refer to FIG. 4) is not described. In the present embodiment, each of the wireless devices 11a to 11c has its own priority, the packets transmitted from wireless devices 11a to 11c are aggregated and separated in the order of priority. The setting of the priority is performed by, for example, the packet processing apparatus 17 shown in FIG. 1.

Figure 10:
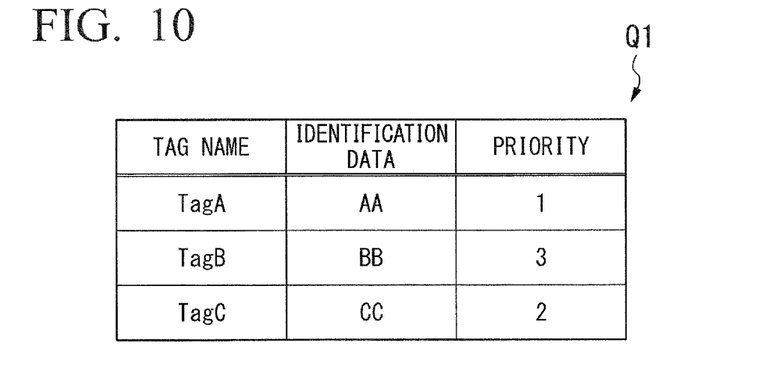
FIG. 10 is a diagram showing an example of wireless device information used in a fifth embodiment of the present invention.

FIG. 10 is a diagram showing an example pf wireless device information used in the fifth embodiment of the present invention. As shown in FIG. 10, in wireless device information Q1 (table) used in the packet processing apparatus 17 of the present embodiment, priorities are associated with those shown in FIG. 5. In the example shown in FIG. 10, a priority "1" is associated with the tag name "TagA" and identification data "AA" set for the wireless device 11a, a priority "3" is associated with the tag name "TagB" and identification data "BB" set for the wireless device 11b, and a priority "2" is associated with the tag name "TagC" and identification data "CC" set for the wireless device 11c.

A priority similar to that shown in FIG. 10 is set for the wireless adapter 12. The priority set for the packet processing apparatus 17 and the priority set for the wireless adapter 12 are not necessarily the same as each other, and may be different from each other. In the present embodiment, in order to simplify the description, a description will be provided for the case in which the priority shown in FIG. 10 is set to each of the packet processing apparatus 17 and the wireless adapter 12.

The aggregator 25 of the wireless adapter 12 (refer to FIG. 2) preferentially aggregates a packet transmitted from a wireless device having a higher priority in the aggregated packet P20 when the aggregator 25 aggregates the packets stored in the memory 27. If the priorities shown in FIG. 10 are set, the packet transmitted from the wireless device 11a, the packet transmitted from the wireless device 11c, and the packet transmitted from the wireless device 11b in this order are aggregated in the aggregated packet P20.

The separator 33 of the packet processing apparatus 17 (refer to FIG. 4) preferentially separates the identification data associated with the higher priority when the separator 33 separates the aggregated packet P20 based on the identification data included in the wireless device information Q1. In the case of the wireless device information Q1 shown in FIG. 10, first, the separator 33 separates, from the aggregated packet P20, data including the time data "T1", the identification data "AA", and the sensor data "aa" based on the identification data "AA" associated with the highest priority (refer to FIG. 7). Next, the separator 33 separates, from the aggregated packet P20, data including the time data "T3", the identification data "CC", and the sensor data "cccc" based on the identification data "CC" associated with the next highest priority. Finally, the separator 33 separates, from the aggregated packet P20, data including the time data "T2", the identification data "BB", and the sensor data "bbbbb" based on the identification data "BB" associated with the lowest priority. The separator 33 generates the separated packets using the separated data in the separation order.

As described above, in the present embodiment, each of the wireless devices 11a to 11c has its own priority, the packet transmitted from the wireless devices 11a to 11c are preferentially aggregated and separated in the order of priority. Thereby, the collection time of packets transmitted from a wireless device having a higher priority can be reduced.

While the wireless relay device, the processing apparatus, the wireless communication system, and the wireless communication method according to the embodiments of the present invention have been described above, the present invention is not limited to the above-described embodiments, but may be freely modified within the scope of the present invention. For example, in the above-described embodiments, since the packets via the wireless network N1 are encrypted, the packets transferred to the control network N3 via the wireless network N1 and the backbone network N2 are decrypted by the gateway 16. However, if packets via the wireless network N1 are not encrypted, the packets need not to be decrypted by the gateway 16.

In the above-described embodiments, the example has been described in which the system manager 15 collectively manages the wireless network N1. However, the function of the system manager 15 may be provided in the wireless adapter 12, and wireless network managed by the system manager 15 and wireless network managed by the wireless adapter 12 (wireless network formed by the wireless devices 11a to 11c under the wireless adapter 12) may be divided. When such a management is performed, a part of the functions of the system manager 15 may be provided in the packet processing apparatus 17 and the packet processing apparatus 17 may manage the encryption keys K1 to K3.

The above-described first to fifth embodiments are not independent from each other, and may be combined. For example, the fourth embodiment and the fifth embodiment may be combined, and packets may be aggregated based on the priority without exceeding the maximum aggregation number. In the above-described embodiments, the example has been described in which the backbone routers 14a and 14b, the system manager 15, the gateway 16, and the packet processing apparatus 17 are implemented as separate apparatus from each other. However, two or more of these apparatuses (for example, the gateway 16 and the packet processing apparatus 17 are integrated) may be implemented as a single apparatus.

The wireless communication system of the above-described embodiments may include, but is not limited to: one or more software components; and one or more hardware processors that are, when executing one or more software components, configured to implement each function of the wireless communication system. Alternatively, each function of the wireless communication system may be implemented by circuitry.

The term "hardware processor" may be implemented by one or more hardware components. The hardware processor is configured to execute one or more software components and configured, when executing the one or more software components, to perform one or more acts or operations in accordance with codes or instructions included in the one or more software components.

The term "circuitry" refers to a system of circuits which is configured to perform one or more acts or operations. The term "circuitry" is implemented by hardware and software components.

What is claimed is:

1. A wireless relay device for relaying packets via a wireless network, comprising:
   a memory; and
   a processor coupled to the memory and configured to:
   aggregate a plurality of sets of data, the plurality of sets of data being respectively included in a plurality of first packets transmitted from a plurality of wireless devices in the wireless network and under the wireless relay device, to generate a second packet, the plurality of first packets being addressed to the wireless relay device; and transfer the second packet to a transfer destination, wherein a size of a header of the plurality of first packets is larger than a size of a payload of the plurality of first packets, and the processor is configured to aggregate a plurality of sets of time data, each of which is included in a header of each of the plurality of first packets, a plurality of sets of identification data, each of which identifies each of the plurality of wireless devices and is included in the header, and a plurality of sets of payload data, each of which is included in a payload of each of the plurality of first packets, to generate the second packet, wherein the processor is configured to incorporate reference time data indicating a reference time into the second packet, and to aggregate the plurality of sets of time data, each of which is included in the header of each of the plurality of first packets, as a plurality of sets of offset data, each of which indicates a deviation time with respect to the reference time.

2. The wireless relay device according to claim 1, further comprising a storage storing the plurality of sets of data respectively included in the plurality of first packets, and wherein the processor is further configured to control a timing of generation of the second packet using the plurality of sets of data stored in the storage, and a timing of transfer of the generated second packet.

3. The wireless relay device according to claim 2, wherein the processor is further configured to update data previously stored in the storage with new data to be stored in the storage when the storage previously stores the data, a transmission source of which is the same as that of the new data.

4. The wireless relay device according to claim 1, wherein each of the plurality of wireless devices has its own priority, and the processor is configured to aggregate the plurality of sets of data in the order of priority, the plurality of sets of data being associated with the priorities of the plurality of wireless devices.

5. The wireless relay device according to claim 1, wherein the processor is configured to aggregate the plurality of sets of data respectively included in the plurality of first packets, unless the number of the plurality of first packets exceeds a maximum aggregation number.

6. The wireless relay device according to claim 1, wherein packets to be transferred via the wireless network are encrypted, and the processor is further configured to:

decrypt the plurality of first packets addressed to the wireless relay device, and to encrypt the second packet to be transferred to the transfer destination.

7. A processing apparatus communicatively connectable to a wireless relay device for relaying packets via a wireless network, the wireless relay device being for aggregating a plurality of sets of data respectively included in a plurality of first packets transmitted from a plurality of wireless devices in the wireless network to generate a second packet, the processing apparatus comprising:

a memory; and a processor coupled to the memory and configured to:

separate data included in the second packet transferred from the wireless relay device to generate a plurality of third packets; and transfer the plurality of third packets to a transfer destination, wherein a size of a header of the plurality of first packets is larger than a size of a payload of the plurality of first packets, the wireless relay device aggregates a plurality of sets of time data, each of which is included in a header of each of the plurality of first packets, a plurality of sets of identification data, each of which identifies each of the plurality of wireless devices and is included in the header, and a plurality of sets of payload data, each of which is included in a payload of each of the plurality of first packets, to generate the second packet, and the processor is configured to incorporate reference time data indicating a reference time into the second packet, and to aggregate the plurality of sets of time data, each of which is included in the header of each of the plurality of first packets, as a plurality of sets of offset data, each of which indicates a deviation time with respect to the reference time.

8. The processing apparatus according to claim 7, wherein the processor is configured to separate data of a payload in the second packet based on a plurality of sets of identification data, each of which identifies each of the plurality of wireless devices and is included in the payload in the second packet.

9. The processing apparatus according to claim 8, wherein each of the plurality of sets of identification data has its own priority, and the processor is configured to separate the plurality of sets of identification data included in the payload in the second packet in the order of priority.

10. The processing apparatus according to claim 7, wherein the processor is further configured to set a maximum aggregation number of the plurality of first packets to the wireless relay device.

11. A wireless communication system for performing wireless communication via a wireless network, comprising:

a wireless relay device for relaying packets via the wireless network, comprising:

a first memory; and a first processor coupled to the first memory and configured to:

aggregate a plurality of sets of data, the plurality of sets of data being respectively included in a plurality of first packets transmitted from a plurality of wireless devices in the wireless network and under the wireless relay device, to generate a second packet, the plurality of first packets being addressed to the wireless relay device; and transfer the second packet to a first transfer destination; and a processing apparatus communicatively connectable to the wireless relay device, comprising:

a second memory; and a second processor coupled to the second memory and configured to:

separate data included in the second packet transferred from the wireless relay device to generate a plurality of third packets; and transfer the plurality of third packets to a second transfer destination, wherein a size of a header of the plurality of first packets is larger than a size of a payload of the plurality of first packets, the first processor is configured to aggregate a plurality of sets of time data, each of which is included in a header of each of the plurality of first packets, a plurality of sets of identification data, each of which identifies each of the plurality of wireless devices and is included in the header, and a plurality of sets of payload data, each of which is included in a payload of each of the plurality of first packets, to generate the second packet, and the first processor is configured to incorporate reference time data indicating a reference time into the second packet, and to aggregate the plurality of sets of time data, each of which is included in the header of each of the plurality of first packets, as a plurality of sets of offset data, each of which indicates a deviation time with respect to the reference time.

12. The wireless communication system according to claim 11, wherein the wireless relay device further comprises a storage storing the plurality of sets of data respectively included in the plurality of first packets, and the first processor is further configured to control a timing of generation of the second packet using the plurality of sets of data stored in the storage, and a timing of transfer of the generated second packet.

13. The wireless communication system according to claim 12, wherein the first processor is further configured to update data previously stored in the storage with new data to be stored in the storage when the storage previously stores the data, a transmission source of which is the same as that of the new data.

14. The wireless communication system according to claim 11, wherein each of the plurality of wireless devices has its own priority, and the first processor is configured to aggregate the plurality of sets of data in the order of priority, the plurality of sets of data being associated with the priorities of the plurality of wireless devices.

15. The wireless communication system according to claim 11, wherein the first processor is configured to aggregate the plurality of sets of data respectively included in the plurality of first packets, unless the number of the plurality of first packets exceeds a maximum aggregation number.

16. A wireless communication method for performing wireless communication via a wireless network, comprising:

aggregating a plurality of sets of data respectively included in a plurality of first packets transmitted via the wireless network to generate a second packet;

transferring the second packet to a first transfer destination via the wireless network;

separating data included in the second packet to generate a plurality of third packets; and transferring the plurality of third packets to a second transfer destination, wherein a size of a header of the plurality of first packets is larger than a size of a payload of the plurality of first packets, the aggregating includes aggregating a plurality of sets of time data, each of which is included in a header of each of the plurality of first packets, a plurality of sets of identification data, each of which identifies each of the plurality of wireless devices and is included in the header, and a plurality of sets of payload data, each of which is included in a payload of each of the plurality of first packets, to generate the second packet, and reference time data indicating a reference time is incorporated into the second packet, and the plurality of sets of time data, each of which is included in the header of each of the plurality of first packets, are aggregated as a plurality of sets of offset data, each of which indicates a deviation time with respect to the reference time.

* * * * *